May 16, 1933.  F. C. BUCHANAN  1,908,684
DOUBLE SHELL TANK VEHICLE
Filed April 14, 1930  2 Sheets-Sheet 1
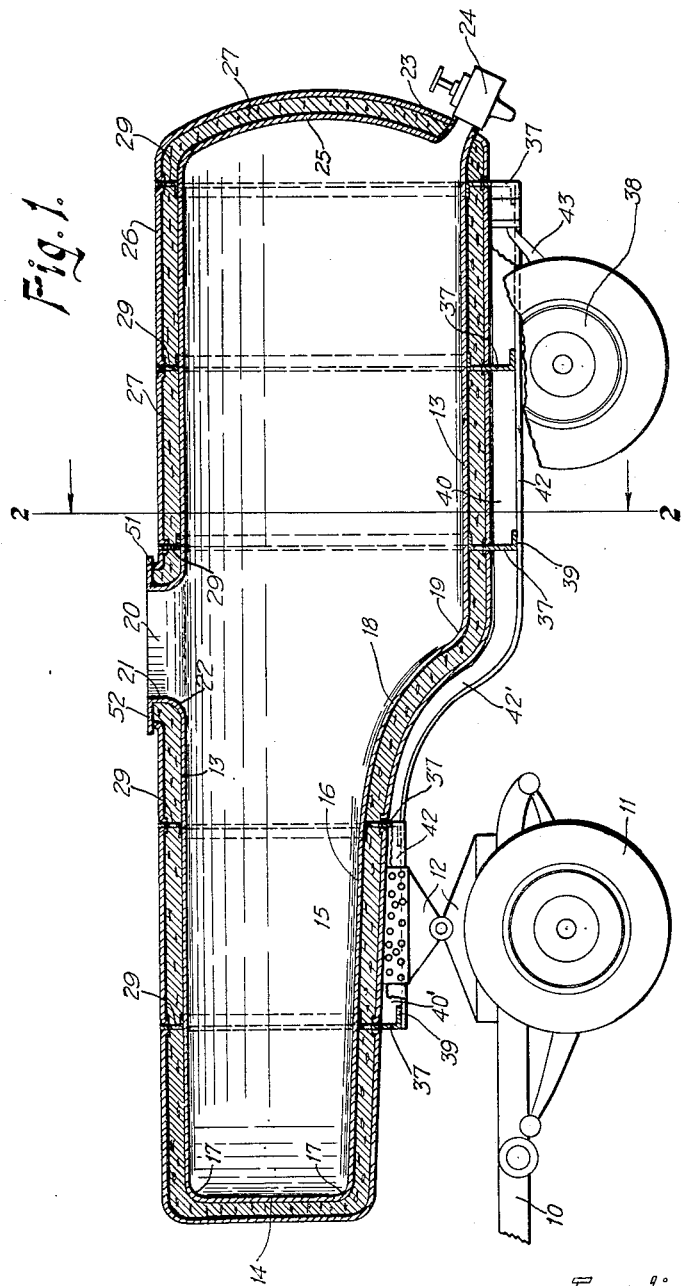
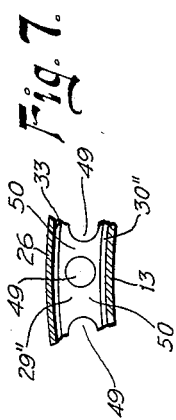
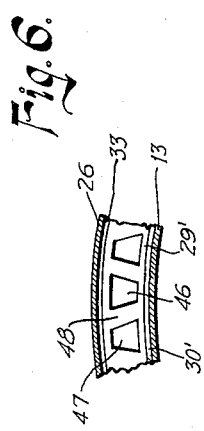
INVENTOR.
Ferdinand C. Buchanan.
BY
Alfred R. Fuchs
ATTORNEY.

May 16, 1933. F. C. BUCHANAN 1,908,684
DOUBLE SHELL TANK VEHICLE
Filed April 14, 1930   2 Sheets-Sheet 2

INVENTOR.
Ferdinand C. Buchanan
BY Alfred R. Fuchs
ATTORNEY.

Patented May 16, 1933

1,908,684

UNITED STATES PATENT OFFICE

FERDINAND C. BUCHANAN, OF KANSAS CITY, MISSOURI, ASSIGNOR TO ANDREW A. KRAMER, OF KANSAS CITY, MISSOURI

DOUBLE SHELL TANK VEHICLE

Application filed April 14, 1930. Serial No. 444,060.

My invention relates to vehicle tanks and more particularly to double shell vehicle tanks.

It is a purpose of my invention to provide a vehicle tank having an inner liquid receiving shell portion and an outer shell portion, the inner liquid receiving shell portion being mounted within the outer shell portion in such a manner that the weight of the contents of the tank is distributed between the inner and outer shell portions. This is accomplished by providing means between said inner and outer shell portions that connect said shell portions, and transmit the stresses produced on the inner shell portion to the outer shell portion and vice versa to distribute the stresses between said inner and outer shell portions. It is particularly advantageous to provide a tank of the character referred to, to transport liquids such as milk. Tanks for this purpose are preferably so made that there are no sharp corners or projecting parts that interfere with the complete cleaning, and perfect sterilization of the walls of the milk containing part of the tank. While tanks have been used that had a smooth inner contour, and which had a jacket spaced therefrom which had insulating material between the liquid containing tank and the outer jacket, the jacket was merely a cover for the insulating material and did not serve to aid in sustaining the weight of the liquid.

It is, accordingly, a further purpose of my invention to provide a tank that has an inner liquid receiving shell portion that is provided with wall portions that are smooth in contour and have no abrupt corners or projections therein, which is preferably made of a non-corrosive alloy or metal, and an outer shell portion spaced from said inner non-corrosive shell portion and aiding in supporting the load with heat insulating material between said shell portions, and means extending between said shell portions and engaging both thereof to transmit the load from the inner liquid containing shell portion to the outer shell portion so as to divide the load therebetween.

It is particularly a purpose of my invention to provide means between the inner and outer shell portions of the tank, such as that referred to above, comprising ring-like members secured to both the inner and outer shell portions, said ring-like members being preferably perforated to reduce the radiation of heat from said inner to said outer shell portions. My invention further contemplates the provision of such ring-like members that lie entirely outside the inner shell portion and extend beyond the outer shell portion for the purpose of mounting said tank upon wheeled supporting means, and to enable other devices to be attached to said tank, should this be desired.

It is a specific purpose of my invention to provide a semi-trailer tank vehicle having means for supporting the same on a pulling vehicle, and wheeled means for supporting the same, spaced from said pulling vehicle, with an outer shell portion mounted on said pulling vehicle and on said wheeled supporting means and an inner shell within said outer shell portion and spaced therefrom, heat insulating material being provided between said inner and outer portions and means being provided extending between said inner and outer shell portions for supporting the inner shell portion within the outer shell portion, said means extending externally of the outer shell portion under said tank for supporting said tank on the pulling vehicle and the wheeled supporting means spaced from the pulling vehicle, said inner and outer shell portions being offset to provide a depressed portion supported by said wheeled supporting means and a portion having a raised bottom supported by the pulling vehicle, said wheeled supporting means and the supporting means on the pulling vehicle being connected solely by the tank and its integral bracing means.

Other objects and advantages of my invention will appear as the description of the drawings proceeds. I desire to have it understood, however, that I do not intend to limit myself to the particular details of the structure shown or described, but that I intend to include as part of my invention all such obvious changes and modifications as would appear to a person skilled in this art and as would fall within the scope of the claims.

In the drawings:

Fig. 1 is a view partly in section and partly in elevation of my improved tank vehicle, the tank being shown in longitudinal section and the vehicle being partly broken away.

Fig. 6 is a fragmentary section of a modified form of tank construction and

Fig. 7 is a view similar to Fig. 6 of a further modification.

Figure 2:
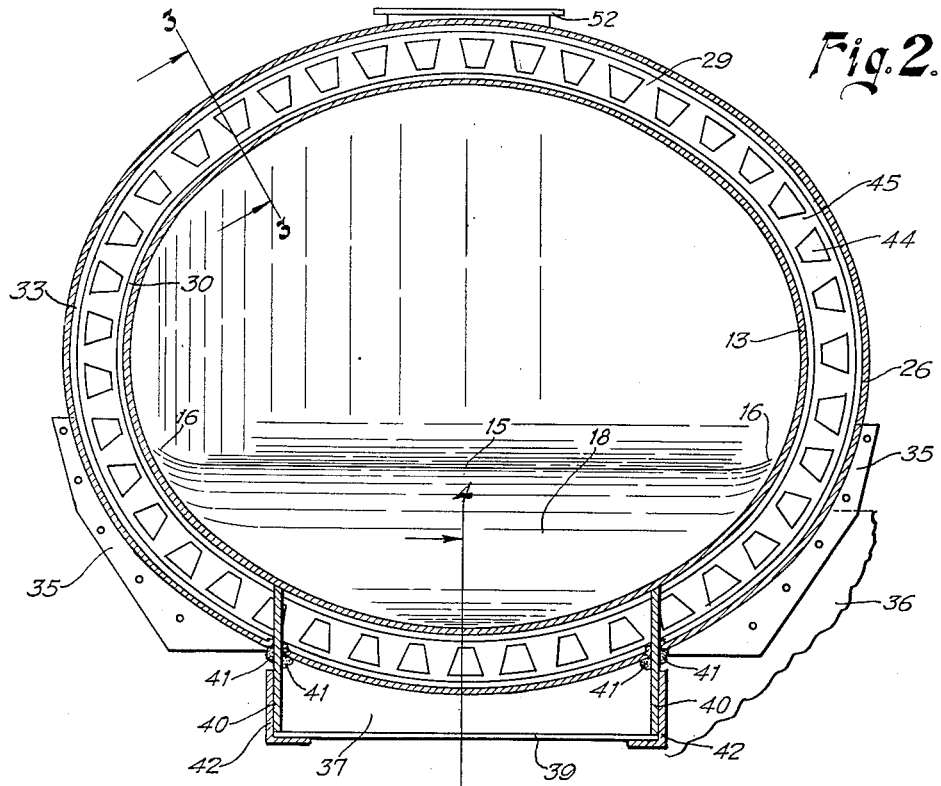
Fig. 2 is a transverse section partly broken away, of my improved tank vehicle taken on the line 2—2 of Fig. 1.

Referring in detail to the drawings my improved tank vehicle is shown as being mounted at its forward end upon a pulling vehicle 10 having the wheels 11, and provided with a fifth wheel structure 12 thereon by means of which the forward end of the tank is supported on the pulling vehicle for pivotal and rocking movement relative thereto.

The vehicle tank comprises an inner shell portion 13, which is preferably made of a non-corrosive metal, such as an alloy made up of approximately 10% nickel, 20% chromium and 70% of low carbon iron. While a specific alloy is referred to which is commercially known as "allegheny metal", it is to be understood that any alloy or metal that is non-corrosive and not affected by the liquid to be placed in the tank, such as milk, may be used. Said inner shell portion 13 is preferably made so that there are no breaks in the contour that are sudden, such as sharp corners or projections, and no means project through said shell portion into the liquid space within the same. The shell portion for a semi-trailer tank is shown, although, obviously, the broad principle of the invention may be applied to other than semi-trailer tanks. In the tank shown the forward end 14 of the inner shell is rounded to provide a rounded nose on the forward end of said tank, and the forward end thereof has the bottom 15 upwardly offset to provide a substantially flat bottom portion therein which joins the curved portions of the shell by means of curved wall portions 16, and said flat wall portion 15 and the curved shell portion are both connected with the curved front wall portion 14 by means of the curved wall portions 17. The bottom 15 furthermore inclines or slopes rearwardly toward the curved wall portion 18, that connects the depressed bottom portion of the inner shell 13 with the raised bottom portion 15 thereof, the curved wall portion 18 connecting with the curved shell portion 13 at the bottom thereof by means of a curved wall portion 19. The main body portion of the tank forming the rear portion thereof is substantially elliptical in cross-section, as will be evident from Fig. 2, being of greater transverse than vertical diameter.

Said inner shell portion is further provided with a filling opening 20. Said shell portion has an upturned flange portion 21 thereon connecting with the curved wall of the shell portion by means of a curved wall portion 22. The inner shell portion 13 is further provided with a downwardly inclined outlet connection 23 at the rear end thereof to which the faucet 24 is connected. The rear end wall 25 of the inner shell may be slightly bulged outwardly, as will be evident from Fig. 1. The inner shell portion 13, it will be noted, is provided with curved surfaces that gradually merge with each other where possible, and is made with as few seams as possible and these are welded so as to produce a substantially one piece inner shell 13, which is made of as smooth and unbroken contour as possible. While the shape of the shell 13 may be varied from that shown, the important thing in the construction thereof is that all abrupt corners or projections therein are avoided. In view of this fact, it is impossible to provide any partitions or other bracing means within the shell 13, and this invention particularly relates to means for supporting said inner liquid receiving shell 13 in such a manner that a strong tank vehicle of large capacity can be provided that has no such bracing means internally of the liquid receiving portion thereof.

Surrounding the inner shell 13 is the outer shell 26, which is made of a shape conforming substantially to that of the shell 13 to provide a space of substantially uniform thickness between said shells 13 and 26, which is filled with heat insulating material 27 of any desired character, such as ground cork. The forward end of the shell 26 is rounded, as shown at 28, to correspond with the rounded end 14 on the inner shell 13.

Figure 3:
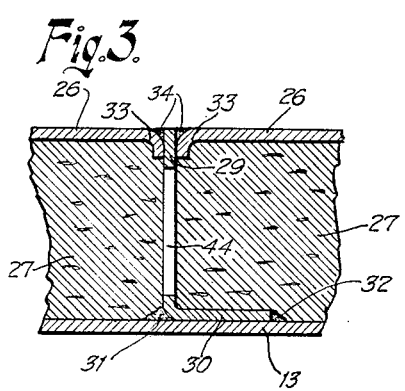
Fig. 3 is an enlarged sectional view taken on the line 3—3 of Fig. 2.
Figure 4:
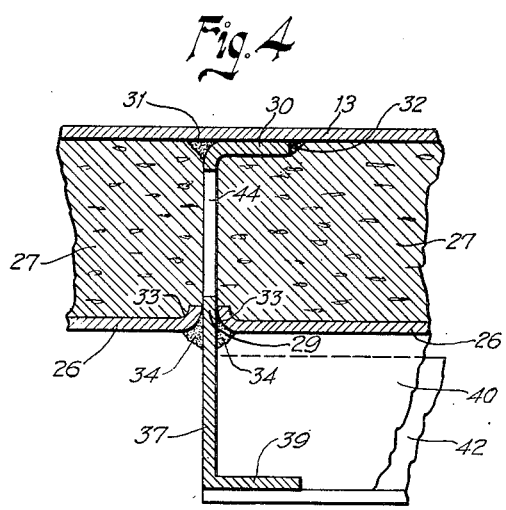
Fig. 4 is an enlarged sectional view taken on the line 4—4 of Fig. 2.
Figure 5:
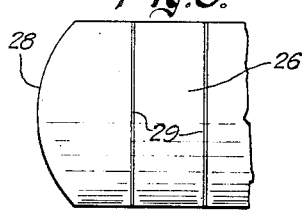
Fig. 5 is a fragmentary plan view of the front end of my improved tank vehicle on a reduced scale.

The outer shell is made up of sections, as will be evident from Figs. 1, 3, and 4, and said outer shell is connected with the inner shell by suitable load transmitting bracing means for supporting the inner shell 13 within the outer shell 26 so that said shells cooperate to support the load. Said bracing means preferably comprises ring-like members 29, having flanges 30 thereon engaging with the outer face of the inner shell 13 and secured thereto by welding, as indicated at 31 and 32. The sheets forming the outer shell 26 are preferably flanged inwardly, as indicated at 33, and the outer peripheral edge portions of the ring-like members 29 extend therebetween and are welded thereto, as indicated at 34. The ring-like members 29 are further provided with lateral extensions 35 that extend beyond the outer shell 26 between the flanges 33 and form brackets for securing any desired members, such as a storage box 36, to the sides of the tank.

Said ring-like members 29 are further provided with downwardly extending portions 37 which extend beyond the shell of the tank, and which form portions of the supporting structure for the tank upon a pulling vehicle 10, or upon the rear wheels 38. Preferably the depending portions 37 of the ring-like members 29 are provided with flanges 39 whereby angle shaped bolsters are formed on the tank integral with the ring-like members 29. The supporting structure for the rear portion of the tank further comprises the plate-like members 40, which are preferably welded to the shell portion 26 at 41, and are also welded to the members 37.

To further reinforce the box-like structure formed by the members 37 and 40, the longitudinally extending angle members 42 are secured in any suitable manner, such as by welding, to the plate-like members 40 and the members 37. The supporting structure thus formed for the rear portion of the tank has the springs 43 connected therewith, said springs 43 being mounted on the axle for the wheels 38 in the usual manner. The forward end of the tank is supported in a similar manner on the fifth wheel structure 12, plates 40' and angles 42 being connected with the members 37 to form a box-like frame structure integral with the ring-like members 29 mounted on said fifth wheel structure 12. The angles 42 preferably extend along the under side of the tank between the rear plate-like members 40 and the front plate-like members 40', and have the upstanding flanges thereof welded to the tank between said members 40 and 40', the portion of the angles 42 extending between said plates being shaped to conform to the contour of the tank, and being designated by the numeral 42'.

The inner shell 13 is heat insulated from the outer shell 26 in a vehicle of the character shown, which is usually utilized for carrying liquids that are to be kept cool, such as milk, and the members 29 being of metal and connected with the inner shell 13 and the outer shell 26 will tend to conduct heat inwardly from the outer shell toward the inner shell. In order to reduce the conduction of heat the ring-like members 29 are provided with openings 44 therein, which are so spaced as to provide fins 45 between the openings connecting the inner and outer portions of the ring 29. The openings 44 are shown in Fig. 2 as being tapering with the wider ends thereof outwardly to thus provide tapering web portions 45 between the same. While the form shown in Fig. 2, is at present preferred, other forms of openings may be used in the ring to reduce the conduction of heat therethrough by providing but a small amount of material through which the heat can travel in a direct path.

In Fig. 6 another form of ring 29' is shown that has alternating tapering openings 46 and 47, the openings 46 having their wide ends outwardly and the openings 47 having their wide ends inwardly, having the adjacent sides of the openings parallel so as to provide the connecting fins or webs 38 that are of substantially uniform width. This arrangement of openings provides no direct path between the inner and outer portions of the ring 29' for the heat in its travel inwardly from the outer shell 26 to the inner shell 13. The ring 29' is otherwise made substantially in the same manner as the ring 29, the flange 30' corresponding to the flange 30 on the member 29.

Instead of using the ring 29 or the ring 29' a ring such as that shown in Fig. 7 may be used in which the ring 29'' is shown as being provided with the circular openings 49 therein providing the webs or fins 50 between the same, said ring 29'' being provided with the flange 30'' corresponding with the flange 30 on the ring 29.

The outer shell 26 is provided with a circular flange 51 thereon and the flange 21 on the inner shell 13 is provided with an outwardly directed flange portion 52, which extends slightly beyond the flange 51 and is secured thereto by welding or in any desired manner, the flange 52 being utilized for securing a filler plug of any well known character thereon.

Having thus described my invention what I claim and desire to secure by United States Letters Patent is:—

1. In a vehicle tank, an inner shell having an offset therein, an outer shell having a corresponding offset therein, longitudinal frame members each having an offset therein corresponding to the offset in said outer shell and web members fixedly secured to said inner and outer shells and to said longitudinal frame members.

2. In a vehicle tank, an inner shell having an offset therein, and having a smooth inner surface having no abrupt changes in the contour thereof, an outer shell having a corresponding offset therein, longitudinally extending frame members each having an offset therein corresponding to the offset in said outer shell and substantially vertical ring-like members integrally united with said inner and outer shells and having downward extensions beyond said outer shell integrally united with said frame members.

3. In a vehicle tank having supporting means under the same comprising spaced transverse supporting members and longitudinal frame members, an outer shell, an inner shell and rigid means extending between and fixedly secured to both said shells to divide the load between said shells.

4. In a vehicle tank having supporting means under the same comprising spaced transverse supporting members and longitudinal frame members, an outer shell, an inner shell and reinforcing and spacing webs extending between and integrally united with both said shells to support said inner shell within said outer shell and divide the load between said inner and outer shells.

5. In a vehicle tank an outer shell, an inner shell and reinforcing and spacing webs extending between and integrally united with both said shells to support said inner shell within said outer shell and divide the load between said inner and outer shells, said web portions lying entirely outside said inner shell and projecting beyond said outer shell to mount said tank on a support.

6. In a vehicle tank having supporting means under the same comprising spaced transverse supporting members and longitudinal frame members, a continuous uninterrupted inner shell, an outer shell spaced from said inner shell, said outer shell comprising a plurality of longitudinally adjacent sections and ring-like reinforcing and spacing members integrally united with the outer surface of said inner shell and extending between and integrally united with the sections of said outer shell to provide a unitary double-shell vehicle tank, whereby the load is divided between said shells.

7. In a vehicle tank a continuous uninterrupted inner shell, an outer shell spaced from said inner shell, said outer shell comprising a plurality of longitudinally adjacent sections and ring-like reinforcing and spacing members integrally united with the outer surface of said inner shell and extending between and integrally united with the sections of said outer shell to provide a unitary double-shell vehicle tank, whereby the load is divided between said shells, said spacing members extending beyond said outer shell on the under side of said tank to provide transverse supporting members thereon integral therewith.

8. In a vehicle tank a continuous uninterrupted inner shell, an outer shell spaced from said inner shell, said outer shell comprising a plurality of longitudinally adjacent sections, ring-like reinforcing and spacing members integrally united with the outer surface of said inner shell and extending between and integrally united with the sections of said outer shell to provide a unitary double-shell vehicle tank, whereby the load is divided between said shells, said spacing members extending beyond said outer shell on the under side of said tank to provide transverse supporting members thereon integral therewith, and longitudinally extending frame members secured to said transverse supporting members to provide an underframe rigid with both said shells.

In testimony whereof, I hereunto subscribe my name this 7 day of April, 1930.

FERDINAND C. BUCHANAN.